United States Patent
Rutherford

(10) Patent No.: US 10,584,451 B2
(45) Date of Patent: Mar. 10, 2020

(54) DEVICE FOR REMOVING ROAD TAPE

(71) Applicant: Kenneth S. Rutherford, Canastota, NY (US)

(72) Inventor: Kenneth S. Rutherford, Canastota, NY (US)

(*) Notice: Subject to any disclaimer, the term of this patent is extended or adjusted under 35 U.S.C. 154(b) by 70 days.

(21) Appl. No.: 15/933,575

(22) Filed: Mar. 23, 2018

(65) Prior Publication Data
US 2018/0274185 A1 Sep. 27, 2018

Related U.S. Application Data

(60) Provisional application No. 62/476,101, filed on Mar. 24, 2017.

(51) Int. Cl.
| | |
|---|---|
| *E01C 23/08* | (2006.01) |
| *F16H 7/12* | (2006.01) |
| *B65H 29/00* | (2006.01) |
| *E01C 23/18* | (2006.01) |
| *B65H 18/02* | (2006.01) |
| *E01C 23/088* | (2006.01) |
| *B65H 18/10* | (2006.01) |

(52) U.S. Cl.
CPC ......... *E01C 23/088* (2013.01); *B65H 18/028* (2013.01); *B65H 18/106* (2013.01); *B65H 29/008* (2013.01); *E01C 23/08* (2013.01); *E01C 23/185* (2013.01); *F16H 7/1218* (2013.01); *B65H 2405/312* (2013.01); *B65H 2405/422* (2013.01); *B65H 2701/1922* (2013.01); *F02B 2275/06* (2013.01)

(58) Field of Classification Search
CPC ........ E01C 23/00; E01C 23/08; E01C 23/088; E01C 23/185; B65H 18/028; B65H 18/106; B65H 29/008; B65H 2405/312; B65H 2405/422; B65H 2701/1922; F16H 7/1218; F02B 2275/06
See application file for complete search history.

(56) References Cited

U.S. PATENT DOCUMENTS

| | | | | |
|---|---|---|---|---|
| 4,162,862 | A * | 7/1979 | Harker | E01C 19/264 404/122 |
| 4,778,119 | A * | 10/1988 | Yamazaki | B65H 18/10 226/190 |
| 6,174,104 | B1 * | 1/2001 | Fields | E01C 23/08 404/83 |
| 6,957,869 | B1 | 10/2005 | Sawtelle | |
| 10,112,794 | B1 * | 10/2018 | Shea | E01C 23/08 |
| 2005/0192144 | A1 * | 9/2005 | Yokoyama | F16H 7/1281 474/117 |
| 2006/0151659 | A1 * | 7/2006 | Anderson | B65H 23/195 242/545.1 |

(Continued)

*Primary Examiner* — Abigail A Risic
(74) *Attorney, Agent, or Firm* — Barclay Damon LLP

(57) ABSTRACT

A device for removing road tape from a surface comprises a body, and a drive assembly coupled to the body. The drive assembly comprises a motor having a drive wheel, at least one drive belt, a rolling drum drive wheel configured to engage the at least one drive belt, and at least one rolling drum configured to secure an end of the road tape. The rolling drum is configured to rotate in response to rotation of the rolling drum drive wheel and wind the road tape about a circumference. The winding of the road tape drives the body in a forward direction.

18 Claims, 7 Drawing Sheets

(56) References Cited

U.S. PATENT DOCUMENTS

| | | | | |
|---|---|---|---|---|
| 2009/0241999 A1* | 10/2009 | Crocker | ................. | B08B 3/024 |
| | | | | 134/111 |
| 2012/0067996 A1* | 3/2012 | Motz | ...................... | E01C 13/08 |
| | | | | 242/416 |
| 2019/0078276 A1* | 3/2019 | Wilkens | ............. | B65H 35/0086 |

* cited by examiner

DEVICE FOR REMOVING ROAD TAPE

CROSS REFERENCE TO RELATED APPLICATION

This patent application is a non-provisional of, and claims the priority and benefit of, U.S. Provisional Patent Application No. 62/476,101, filed on Mar. 24, 2017. The entire contents of such application are hereby incorporated by reference.

TECHNICAL FIELD

This application is directed generally to the field of tools and more specifically to a device for easily removing road tape from highways and other surfaces in a manner that provides for easy transport and disposal.

BACKGROUND

Every year, thousands of miles of roadway are under construction. These roadway construction projects vary in scope from simple patching and resurfacing to the construction of a brand new road. In most cases, traffic must continue to flow through the construction zone, which requires a reconfiguration or rerouting of the traffic flow in order to protect the drivers and the construction workers. Rerouting the traffic flow requires additional road markings to be installed to alert drivers of the new and temporary traffic pattern. In some situations, new paint markings may be sprayed, but paint markings take longer to apply and are difficult to remove, which makes them less than ideal for a temporary situation.

Another method of marking pavement is the use of special tapes. These roadway or pavement marking tapes may be made from a variety of materials, such as vinyl, and have an adhesive layer on one side that is made to adhere to a treated pavement surface. Road tapes are relatively easy to install and, in some instances, the manufacturer will provide a proprietary tool to aid in the installation. However, removal of this tape after a construction projection is completed can be a difficult task, especially if the tape has been adhered to a pavement surface for a prolonged period of time and exposed to high heat and traffic volume. Peeling the tape off the pavement surface in one piece is desirable because it is faster, however doing this can be challenging and difficult work.

One method used to remove road tape is by attaching a loose end of the tape to a vehicle and attempting to peel the tape off the roadway by accelerating the vehicle forward in the direction of the tape that is still attached to the pavement. This is a cumbersome way to remove the road tape and the high horsepower of the vehicle makes ripping the tape very easy to do. Moreover, in the case of large roadway construction projects, there may be thousands of feet and hundreds of pounds of road tape to peel and dispose of. Peeling the tape off the pavement surface with a vehicle or other means leaves many long pieces of tape that require additional labor to gather and load into trucks or dumpsters for disposal. For example, gathering these pieces of tape may require a loading machine.

Other peeling devices exist that feed the peeled road tape directly into the bed of a truck, however such devices result in inefficient and unstable loading of the used road tape. Furthermore, these devices require that a large amount of tape be initially peeled from the pavement surface and threaded through the device. These devices also rely on carefully matching the speed of the removal device with the speed of the truck that is carrying the used tape. Any mismatch in speed will result in the tearing of the tape and the rethreading process will have to be performed again.

The foregoing background describes some, but not necessarily all, of the problems, disadvantages and shortcomings related to current road tape removal devices. There is a general and pervasive need in the field to provide a device for removing road tape in an easy, inexpensive manner, which also results in easy disposal of the peeled tape.

SUMMARY

In an embodiment, a device for removing road tape from a surface comprises a body having a forward end and a rearward end and a drive assembly coupled to the body. The drive assembly comprises, a motor having a drive wheel, at least one drive belt having a first end in engagement with the drive wheel, a rolling drum drive wheel in engagement with an opposite end of the at least one drive belt and configured to rotate about an axis, and at least one rolling drum configured to secure an end of the road tape. The at least one rolling drum is further configured to rotate about the axis in response to the rotation of the rolling drum drive wheel about the axis. The rolling drum is configured to wind the road tape around a circumference such that the winding of the road tape drives the body in a direction toward the forward end.

In another embodiment, the device for removing road tape comprises a drive assembly. The drive assembly comprises a motor having a drive wheel, a rolling drum drive wheel, and at least one drive belt configured to engage the drive wheel at one end and the rolling drum drive wheel at an opposite end. The drive wheel advances the drive belt and causes rotation of the rolling drum drive wheel. The device further comprises at least one rolling drum configured secure an end of the road tape, wherein the rotation of the rolling drum drive wheel causes the at least one rolling drum to rotate. The at least one rolling drum is configured to wind the road tape around a circumference and drive the device in a forward direction.

In another embodiment, the device for removing tape comprises a drive assembly and at least one rolling drum configured secure an end of a length of tape. The drive assembly is configured to rotate the at least one rolling drum to wind the tape around a circumference of the at least one rolling drum. The winding of the tape drives the device in a forward direction.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION

The following discussion relates to various embodiments of a device for removing road tape. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "forward", "rearward", "interior", "exterior", "front", "back", "top", "bottom", "inner", "outer", "inside", "outside", and the like are not intended to limit these concepts, except where so specifically indicated. Terms such as "approximately" and "about" are meant to encompass a range of 80-125% of the claimed value. With regard to the drawings, their purpose is to depict salient features of the inventive device for removing road tape and are not specifically provided to scale.

Figure 1:
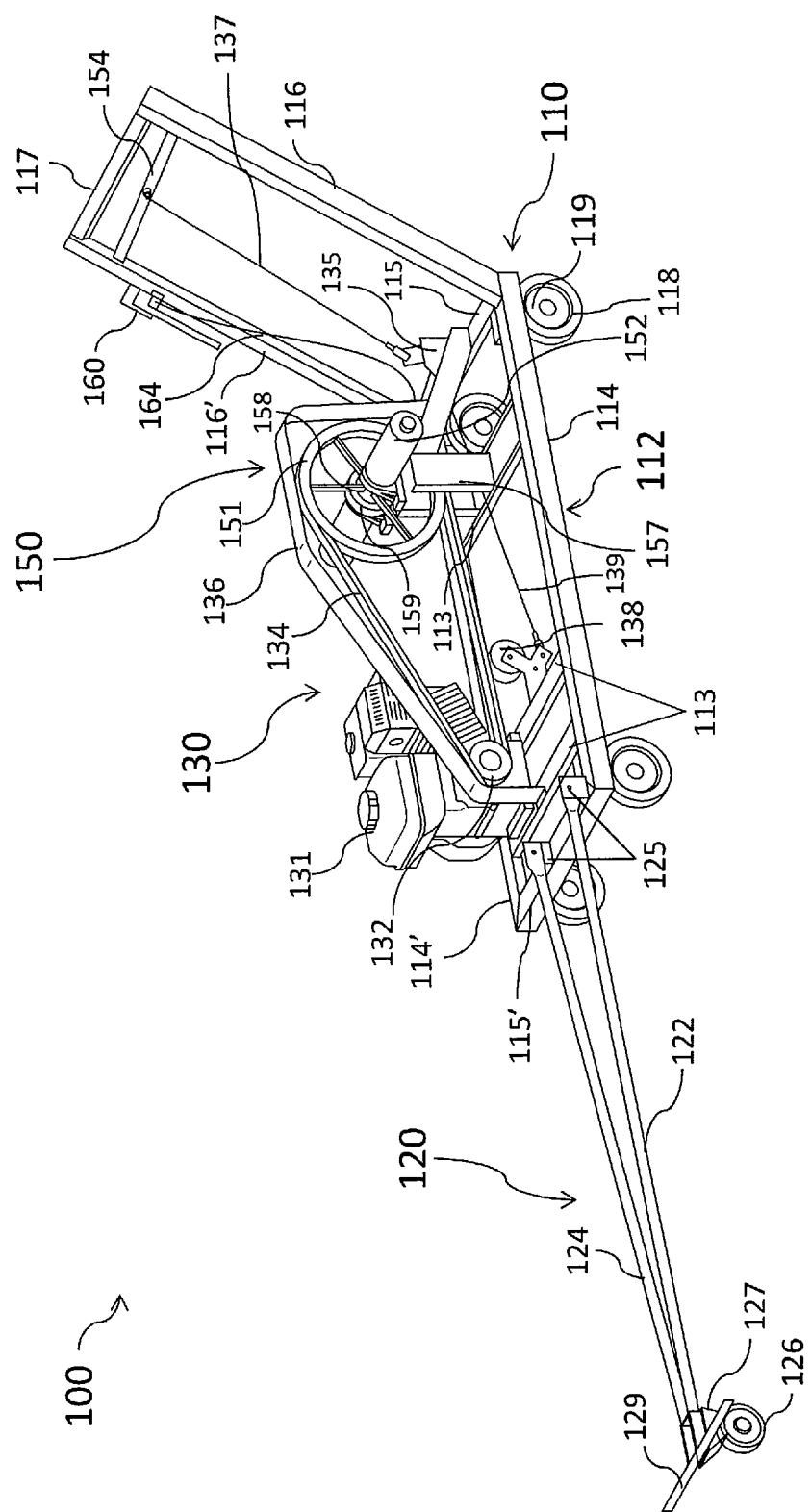
FIG. 1 is an isometric side view of an embodiment of a device for removing road tape.
Figure 2:
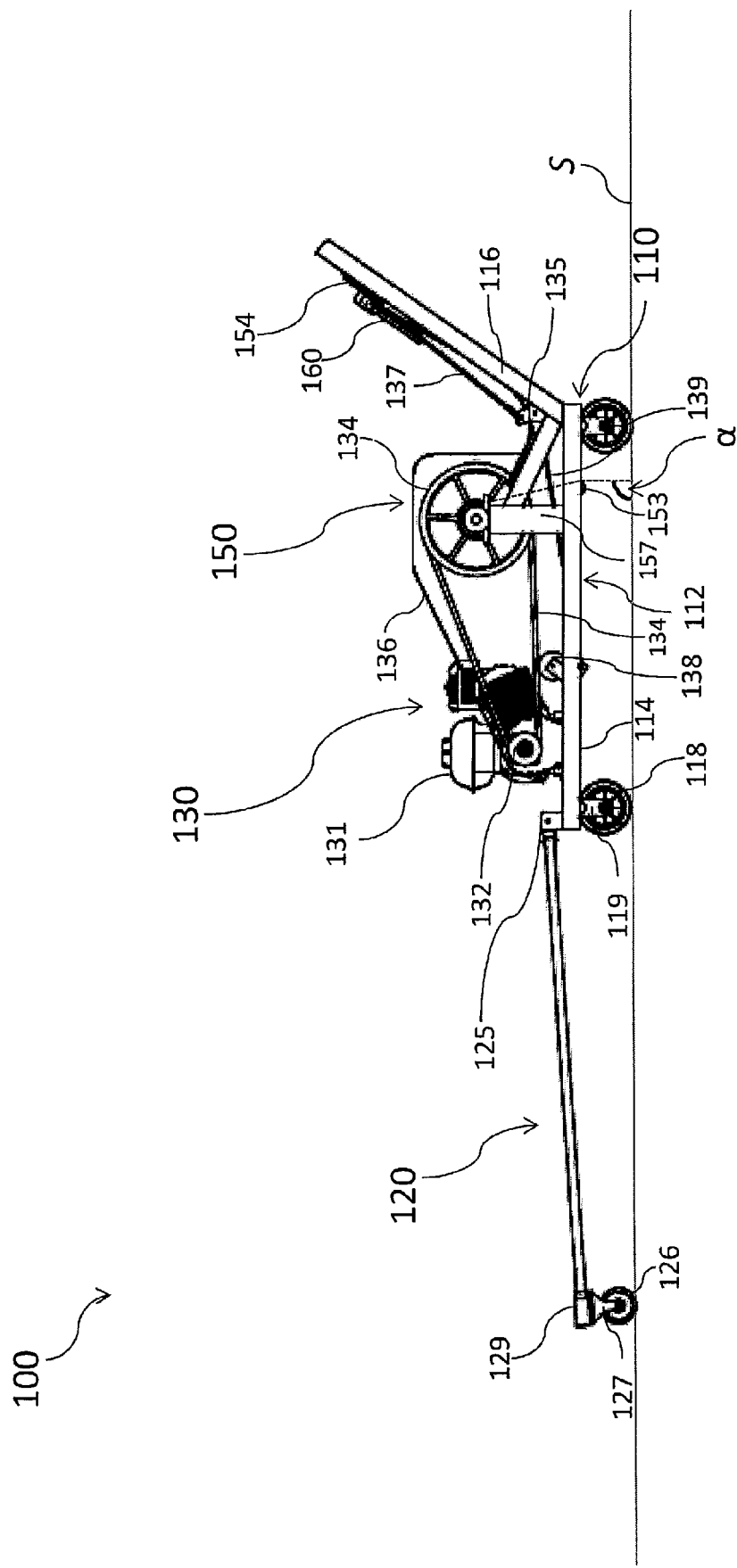
FIG. 2 is side plan view of an embodiment of the device for removing road tape.

First and as illustrated in the embodiments of FIGS. 1 and 2, a device for removing road tape 100 generally includes a body 110, a drive assembly 130 and a winding assembly 150.

Figure 3:
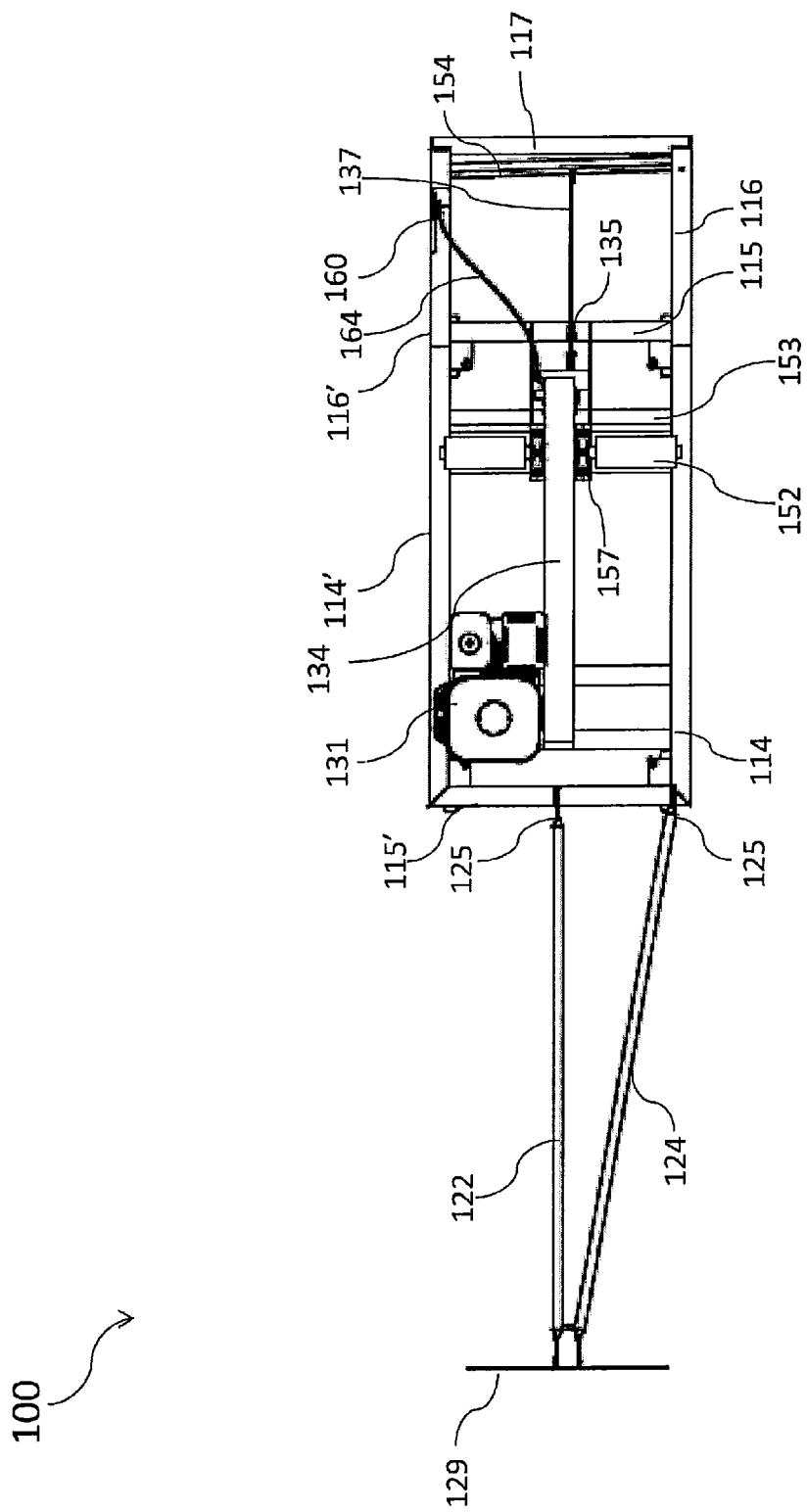
FIG. 3 is a top plan view of an embodiment of the device for removing road tape.
Figure 4:
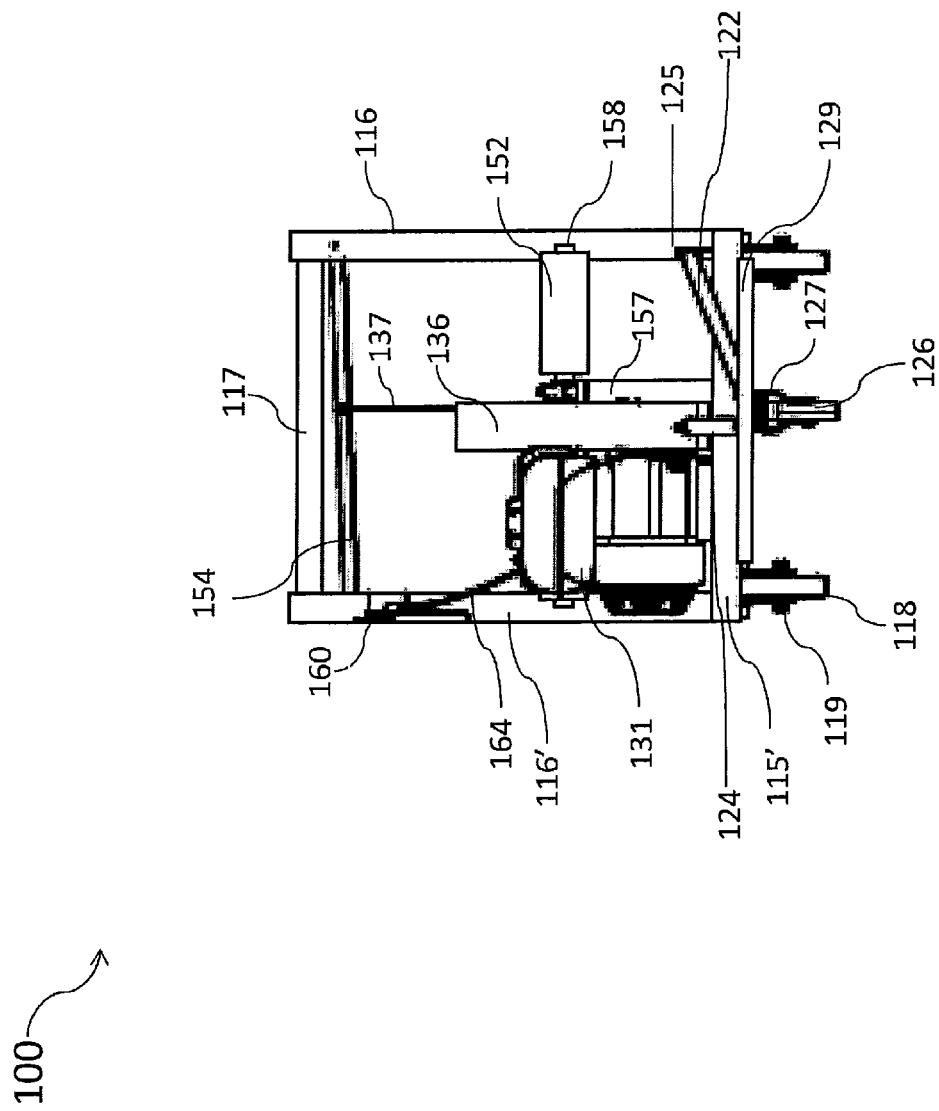
FIG. 4 is a front plan view of an embodiment of the device for removing tape.

As shown in FIGS. 1-5, the body110 may include a base 112, which has a left side 114 (FIGS. 1-3), a right side 114' (FIGS. 1, 3, and 6), a back end 115 (FIGS. 1, 3, 5), and a front end 115' (FIGS. 1, 3, 4). The base 112 provides a rigid structure for coupling mechanical and mobility components. In an embodiment, the base 112 is generally a rectangular polygon, however in other embodiments the base 112 is not a rectangular polygon. The base 112 may have one or more cross members 113 (FIGS. 1, 3) configured to provide increased rigidity as well as additional surfaces to support other components of the device 100. In another embodiment, additional support members may be positioned at an angle relative to the one or more cross members 113 (FIGS. 1, 3) to provide added support in the longitudinal direction and create a lattice within the boundaries of the base 112. The base 112 also includes two or more wheels 118, casters, or rollers that are each rotatably coupled to the underside of the base 112 with a mount 119. As shown in the embodiments of FIGS. 1-6, the base 112 includes four (4) wheels 118, each rotatably coupled to the base 112 by a mount 119. In an embodiment, two or more of wheels 118 may be configured to rotate or swivel about a vertical axis to aid in the steering of the device 100.

Figure 5:
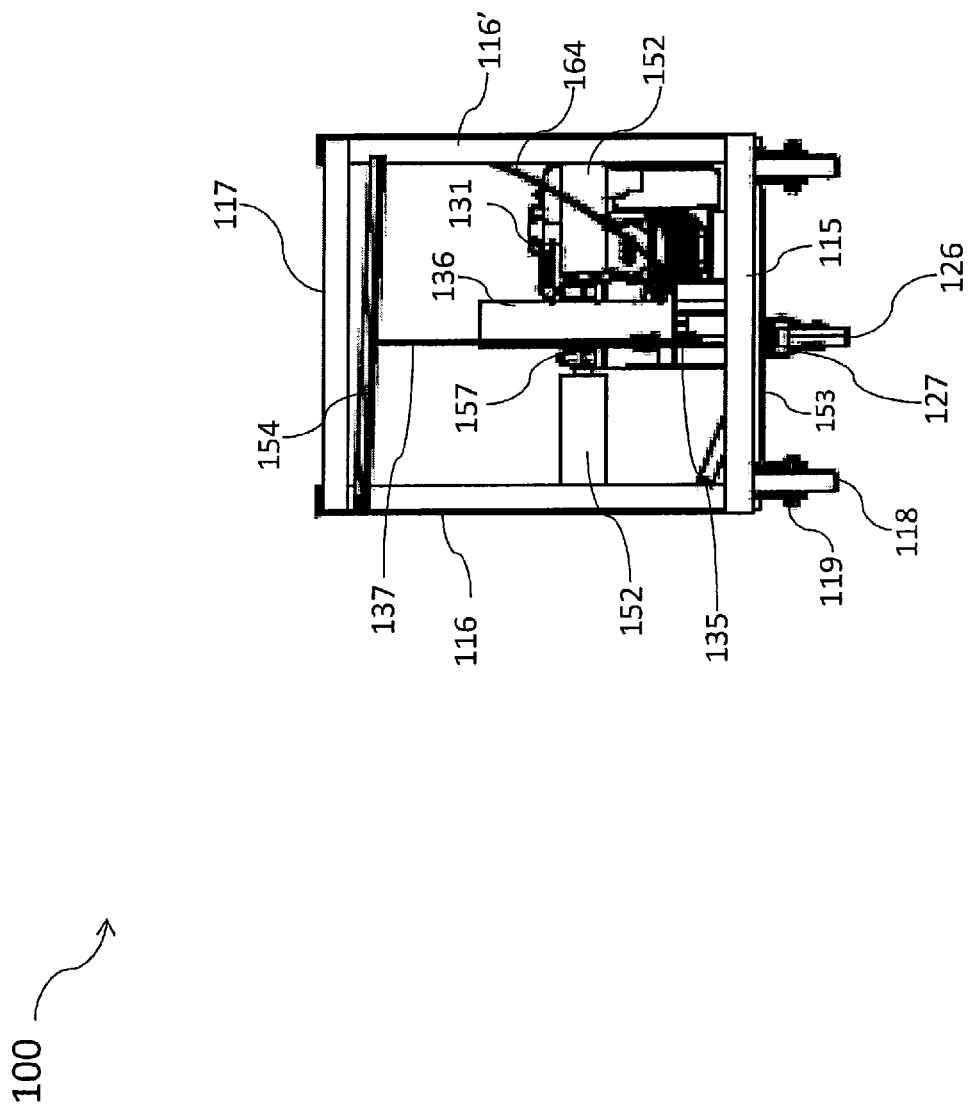
FIG. 5 is a back plan view of an embodiment of the device for removing road tape.

Referring to FIGS. 1 and 4-5, the body 110 further comprises one or more handle supports 116, 116' configured to engage a handle 117. As shown, the body 110 comprises a left handle support 116 and a right handle support 116' configured to couple to and support the handle 117. In an embodiment, the one or more handle supports 116, 116' are a formed as a single unitary component with the handle 117, however in other embodiments they may be separate components coupled together using one or more welded joints, mechanical fasteners, or any other coupling method that would provide a durable and secure joint. In an embodiment, the one or more handle supports 116, 116' may be adjustable. As shown in FIGS. 1 and 4-5, the one or more handle supports 116, 116' extend from the back end 115 of the base 112 at an angle that is greater than 90° relative to the base 112. In another embodiment, the handle supports 116, 116' extend from the back end 115 of the base 112 at an angle that is not greater than 90° relative to the base 112.

Figure 6:
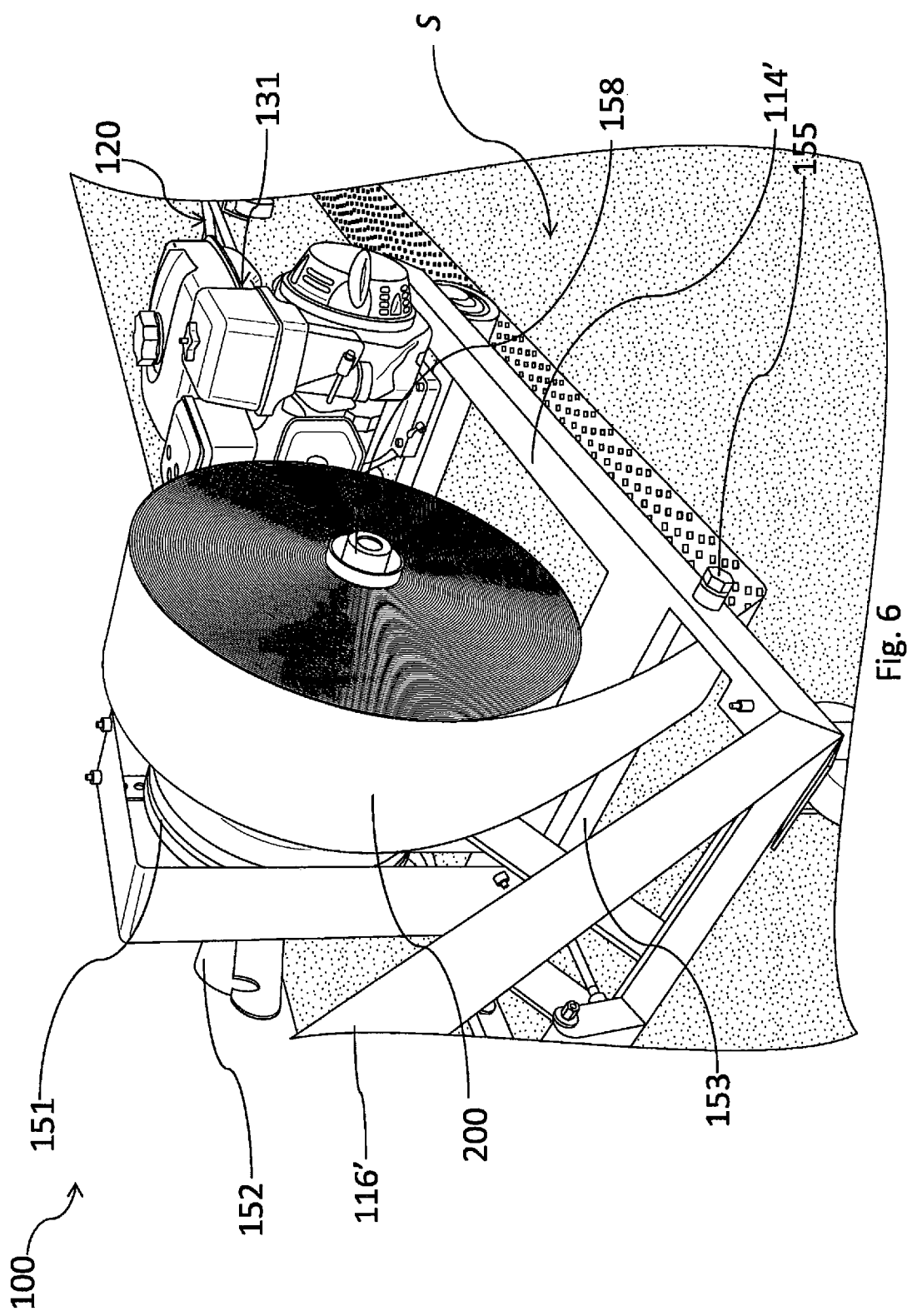
FIG. 6 is a partial isometric side view of an embodiment of the device for removing tape peeling the road tape from a paved surface.

As illustrated in FIGS. 1-3, a pointer 120 extends from the front end 115' of the base 112. The pointer 120 includes a support arm 122 and an alignment arm 124. Both the support arm 122 and the alignment arm 124 are coupled to the front end 115' of the base 112 by one or more hinges 125 (FIG. 1). In another embodiment, one or more support members may extend between the support arm 122 and the alignment arm 124 to provide added rigidity and stability to the pointer 120. As shown in FIGS. 1-3, the pointer 120 is generally triangular in shape and further comprises a pointer wheel 126 that is rotatably coupled to the pointer 120 using a mount 127. In an embodiment, the pointer wheel 126 may also be configured to swivel about a vertical axis. The one or more hinges 125 allow the pointer wheel 126 to move along the contour of the ground or pavement surface. In the embodiments shown in FIGS. 1, 3, and 4, a pointer guide 129 is positioned at the end of the pointer 120 opposite the one or more hinges 125. The pointer guide 129, along with the alignment arm 124, may assist the user in properly aligning the device 100 during operation to ensure even winding of the road tape 200 (FIG. 6).

A drive assembly 130 is coupled to the base 112 of the body 110. As shown in FIGS. 1-6, the drive assembly 130 comprises a motor 131 positioned proximate the front end 115' of the base 112, however in other embodiments, the motor 131 may be positioned at an alternate position along the base 112. In the embodiment shown, the motor 131 is an internal combustion engine, however other embodiments may use an electric or other type of motor. Referring to FIGS. 1-2, the motor 131 includes a drive wheel 132 that engages one end of a drive belt 134. As shown, the drive belt 134 is at least partially shielded or covered by a belt guard 136, however in other embodiments the drive belt 134 is not shielded or covered. In another embodiment, the device 100 does not utilize a drive belt 134 and may comprise, for example, one or more crank shafts, chains, or a single drive wheel that also comprises a rolling drum. As shown in FIGS. 1 and 2, an opposite end of the drive belt 134 engages a rolling drum drive wheel 151 of the winding assembly 150. The drive wheel 132 rotates the drive belt 134, which in turn rotates the rolling drum drive wheel 151, however in other embodiments, additional wheels may be included which are driven or rotated by the drive belt 134.

The motor 131 may have one or more controllers positioned on the one or more handle supports 116, 116' and/or the handle 117. As shown in the embodiments of FIGS. 1-4, a belt engagement control 154 is positioned between the one or more handle supports 116, 116'. The belt engagement control 154 may be coupled to a belt engager 138 using one or more connections. As shown, the belt engagement control 154 is coupled to a lever 135 via a first control thread 137. The lever 135 is coupled to the belt engager via a second control thread 139 such that actuation of the belt engagement control 154 would cause the belt engager 138 to engage a portion of the drive belt 134. The first and second control threads 137, 139 may be comprised of woven steel threads, nylon, or any other suitable material. Engagement of the belt engager 138 applies tension to the drive belt 134 causing the drive belt 134 to become fully engaged with the drive wheel 132 and rolling drum drive wheel 151. Releasing the belt engagement control 154 disengages the belt engager 138 which releases the tension on the drive belt 134 and causes it to slacken or loosen around the drive 132 and the rolling drum drive wheel 151. In this manner, the belt engagement control 154 may be used to increase or decrease the speed in which tape is wound around the at least one rolling drum 152 and hence the forward movement of the device 100. In another embodiment, more than one belt engager 138 may engage the drive belt 134. In other embodiments, the belt engagement control 154 may also include one or more actuable buttons, switches, additional levers, a touch screen, a key ignition, or any combination thereof. In an embodiment, the device 100 may comprise a throttle control that is configured to control the power delivered by the motor 131 to the drive wheel 132 via a throttle body that is configured to regulate air intake by the motor 131.

The winding assembly 150 (FIGS. 1, 2, and 6) generally comprises the rolling drum drive wheel 151 which is coupled to or positioned adjacent to at least one rolling drum 152. The at least one rolling drum 152 is configured to assist in peeling and holding the road tape 200 (FIG. 6). Referring to FIGS. 1 and 3, the rolling drum 152 extends along the axis of rotation of the rolling drum drive wheel 151 towards the sides 114, 114' of the base 112. As shown, the winding assembly 150 comprises two (2) rolling drums 152 positioned on either side of the rolling drum drive wheel 151. This enables the device 100 to accommodate motors 131 with drive wheels 132 on the right side or the left side. Referring to FIG. 1, the rolling drum drive wheel has a diameter that is greater than the diameter of the rolling drum 152. In an embodiment, a spool or spindle may be configured to detachably couple to the rolling drum to further increase the ease of removal and disposal of the peeled road tape 200 (FIG. 6).

As shown in FIGS. 1, 2, and 6, the rolling drum drive wheel 151 is rotatably mounted to the base 112 using a support 157. An axle 158 traverses the rolling drum drive wheel 151 and the rolling drums 152 such that they are configured to rotate together about the same axis in response to the drive belt 134 causing the rotation of the rolling drum drive wheel 151. Still referring to FIGS. 1, 2, and 6, the rolling drum wheel is mounted upright such that its diameter extends along a plane that is substantially perpendicular to the plane of the base 112. A peeling guide 153 is positioned below the center of rotation of the rolling drum 152. In an embodiment, the peeling guide 153 is coupled to the base 112 using one or more mounts 155 (FIG. 6). In an embodiment, the peeling guide 153 may be rotatably mounted to the base 112, however in other embodiments, the peeling guide 153 may be stationary.

Figure 7:
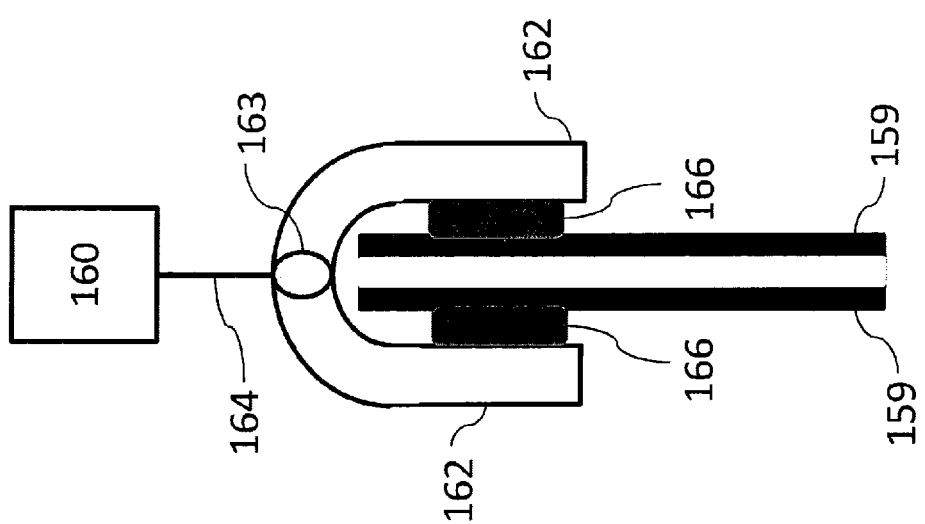
FIG. 7 is a schematic diagram of an embodiment of a braking system having rim brakes.

Referring to FIGS. 1, 3-5, and 7, the device 100 further comprises a braking system that is configured to stop the rolling drum drive wheel 151 and therefore stop the forward progress of the body 110 (or device 100). The braking system comprises a brake control 160 (FIGS. 1 and 3) coupled to or positioned on the one or more handle supports 116, 116' or the handle 117. As shown, the brake control is positioned on the right handle support 116'. The brake control 160 may comprise a lever, button, switch, or any other mechanical means to engage and disengage the braking system. FIG. 7 illustrates a schematic diagram of the braking system with the brake pads 166 engaged with the braking surface 159 of the rolling drum driving wheel 151. As shown, the brake control 160 is coupled to at least one a set of calipers 162 by at least one brake wire 164. The calipers 162 are positioned on either side of the rolling drum drive wheel 151 and each caliper 162 is coupled to a brake pad 166. As shown in FIGS. 1, 3-5, and 7 the braking system comprises one set of calipers 162 and at least one brake wire 164. Accordingly, the below description of the function of the braking system is written with reference to the embodiments shown in FIGS. 1, 3-5, and 7.

Referring to FIG. 7, when the brake control 160 is engaged, tension is applied to the at least one brake wire 164, which in turn applies tension to the set of calipers 162. When tension is applied to the set of calipers 162, each caliper 162 pivots about a pivot point 163 to position the brake pad 166 into contact with a braking surface 159 of the rolling drum drive wheel 151. This causes the rolling drum drive wheel 151 to stop rotating, which in turn stops the rotation of the one or more rolling drums 152 and hence the winding of the road tape 200 (FIG. 6). When the winding of the road tape 200 (FIG. 6) is halted, the forward progress or forward motion of the device 100 is also halted. In this manner, the forward motion of the device 100 may be stopped without shutting down the motor 131. As shown in FIG. 1, the braking system is fitted with rim brakes, however in other embodiments, the braking system may not be fitted with rim brakes and may instead use disk brakes, drum brakes, or any other suitable type of brakes. In another embodiment, a hydraulic braking system may be used. In such an embodiment, the calipers 162 are connected to a supply of hydraulic fluid (not shown) instead of a brake wire 164. The brake control 160 is configured to control the movement of the hydraulic fluid from the supply to the calipers 162 in order to cause the calipers 162 to move the brake pads 166 into contact or out of contact with the braking surface 159. A hydraulic system may also be used in conjunction with the other types of brakes mentioned above.

In another embodiment, a single control unit may be used to control multiple functions of the device 100 such as the braking system and the throttle. In a further embodiment, a secondary braking system may control the braking of one or more of the wheels 118 rotatably coupled to the base 112. The secondary braking system may operate in a similar manner as the braking system previously described.

Referring to FIGS. 1-2 and 7, when road tape 200 (FIG. 6) is desired to be removed from a roadway, parking lot, or other surface, one end of the road tape 200 (FIG. 6) is manually peeled from the pavement, pulled over the peeling guide 153 and wrapped around the rolling drum 152. The motor 131 is then started and the throttle control is engaged, which in turn powers the drive wheel 132. The drive wheel 132 rotates the drive belt 134, which in turn rotates the rolling drum drive wheel 151 and the one or more rolling drums 152. As the one or more rolling drums 152 rotate, the road tape 200 (FIG. 6) is wound around the circumference of the rolling drum 152, which in turn pulls the road tape 200 (FIG. 6) over the peeling guide 153 and away from the pavement.

Referring to FIGS. 2 and 6, the rolling drum 152 and the peeling guide 153 are positioned such that the road tape 200 is peeled from the pavement at an angle a (FIG. 2) relative to the surface S of the pavement or ground. In an embodiment, the angle a ranges from 72°-112.5°. As the rolling drum 152 winds the road tape 200, the body 110 is advanced in a direction toward the front end 115'. A user guides or steers the device 100 as it is advanced in the direction toward the front end 115'. In an embodiment, aligning the alignment arm 124 with the road tape 200 on the surface S of the pavement (or other surface) will ensure even rolling of the peeled road tape 200 around the rolling drum 152. As the amount of road tape 200 wound around the rolling drum 152 increases, the speed at which the device 100 advances will tend to increase such that it may be necessary to decrease the throttle, thereby decreasing power to the motor 131 and slowing the drive wheel 132.

In an embodiment, a remote controller is provided which allows operation of the device 100 from a remote location and allows the user to remotely control various operation variables such as direction and speed. A stop or "kill switch" may be provided to allow the user to quickly stop the operation of the device 100 should a problem be detected. In an embodiment, the "kill switch" may be automatically triggered in response to a change in one or more operating variables being detected such as sudden increase or decrease of speed.

The rolling drum 152 allows for the used road tape 200 (FIG. 6) to be neatly rolled, which decreases the amount of space that the used road tape 200 (FIG. 6) occupies in a dumpster or truck bed. Moreover, the neat rolls of used road tape 200 (FIG. 6) are easy to handle by machines or workers.

Additional embodiments include any one of the embodiments described above and described in any and all exhibits and other materials submitted herewith, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claim. Moreover, although specific terms are employed herein, as well as in the claim which follows, they are used only in a generic and descriptive sense, and not for the purposes of limiting the present disclosure, nor the claims which follow.

The invention claimed is:

1. A device for removing road tape from a surface, the device comprising:
   a body having a forward end and a rearward end; and
   a drive assembly coupled to the body, the drive assembly comprising,
      a motor having a drive wheel,
      at least one drive belt having a first end in engagement with the drive wheel,
      a rolling drum drive wheel in engagement with an opposite end of the at least one drive belt and configured to rotate about an axis, and
      at least one rolling drum configured to secure an end of the road tape, the at least one rolling drum further configured to rotate about the axis in response to the rotation of the rolling drum drive wheel,
   wherein the rolling drum is configured to wind the road tape around its circumference, and wherein the winding of the road tape drives the body in a direction toward the forward end.

2. The device of claim 1, further comprising a braking system comprising,
   a brake control,
   at least one set of calipers, wherein each caliper is coupled to a brake pad, and
   at least one brake wire extending between the brake control and the at least one set of calipers, the at least one brake wire configured to apply tension to the at least one set of calipers to engage brake pads coupled to the at least one set of calipers with the rolling drum drive wheel.

3. The device of claim 2, wherein engagement of the brake pads with the rolling drum drive wheel halts movement of the body in a direction toward the forward end.

4. The device of claim 1, further comprising a pointer extending from the forward end of the body.

5. The device of claim 1, further comprising a belt guard configured to at least partially cover the at least one drive belt.

6. The device of claim 1, further comprising a belt engagement control configured to regulate tension applied to the at least one drive belt.

7. The device of claim 1, further comprising a guide configured to guide the road tape so that it is peeled at an angle relative to the surface, wherein the angle is from 72°-112.5°.

8. A device for removing road tape comprising:
   a drive assembly comprising,
      a motor having a drive wheel,
      a rolling drum drive wheel,
      at least one drive belt configured to engage the drive wheel at one end and the rolling drum drive wheel at an opposite end, wherein rotation of the drive wheel advances the drive belt and causes rotation of the rolling drum drive wheel, and
      at least one rolling drum configured to secure an end of the road tape, wherein the rotation of the rolling drum drive wheel causes the at least one rolling drum to rotate,
   wherein the at least one rolling drum is configured to wind the road tape around a circumference and drive the device in a forward direction.

9. The device of claim 8, further comprising a braking system comprising,
   a brake control,
   at least one set of calipers, wherein each caliper is coupled to a brake pad, and
   at least one brake wire extending between the brake control and the at least one set of calipers, the at least one brake wire configured to apply tension to the at least one set of calipers to engage the brake pads coupled to the at least one set of calipers with the rolling drum drive wheel.

10. The device of claim 9, wherein engagement of the brake pads with the rolling drum drive wheel halts movement of the device in the forward direction.

11. The device of claim 8, further comprising a belt engagement control configured to regulate tension applied to the at least one drive belt.

12. The device of claim 8, further comprising a guide configured to guide the road tape so that it is peeled at an angle relative to a surface, wherein the angle is from 72°-112.5°.

13. A device for removing tape comprising:
   a drive assembly; and
   at least one rolling drum configured to secure an end of a length of tape,
   wherein the drive assembly is configured to rotate the at least one rolling drum to wind the tape around a circumference of the at least one rolling drum, and wherein the winding of the tape drives the device in a forward direction.

14. The device of claim 13, wherein the drive assembly comprises at least one drive wheel.

15. The device of claim 14, further comprising a braking system comprising,
   a brake control,
   at least one set of calipers, wherein each caliper is coupled to a brake pad, and
   at least one brake wire extending between the brake control and the at least one set of calipers, the at least one brake wire configured to apply tension to the at least one set of calipers to engage the brake pads of the at least one set of calipers with the at least one drive wheel.

16. The device of claim 15, wherein engagement of the brake pads with the at least one drive wheel halts movement of the device in the forward direction.

17. The device of claim 16, further comprising a control configured to regulate the movement of the device in the forward direction.

18. The device of claim 13, further comprising a guide configured to guide the tape so that it is peeled at an angle relative to a surface, wherein the angle is from 72°-112.5°.

* * * * *